United States Patent [19]

Tabuchi et al.

[11] Patent Number: 5,051,473
[45] Date of Patent: Sep. 24, 1991

[54] AUTOMOTIVE COATING COMPOSITIONS

[75] Inventors: Ichiro Tabuchi, Atsugi; Noboru Nakai, Hiratsuka; Osamu Isozaki, Yokohama; Takao Matoba, Hiratsuka; Shinji Sugiura, Fujisawa, all of Japan

[73] Assignee: Kansai Paint Company, Limited, Amagasaki, Japan

[21] Appl. No.: 399,136

[22] Filed: Aug. 28, 1989

[30] Foreign Application Priority Data

Sep. 5, 1988 [JP] Japan .................................. 63-222146
Sep. 9, 1988 [JP] Japan .................................. 63-227094

[51] Int. Cl.$^5$ ................................................ C08F 8/00
[52] U.S. Cl. ..................................... 525/100; 525/476; 525/479; 525/475; 528/32; 528/27; 528/21; 528/23; 528/12; 528/24; 528/26; 526/279
[58] Field of Search ............... 525/476, 479, 475, 100; 528/32, 27, 21, 23, 12, 24, 26; 526/279

[56] References Cited

U.S. PATENT DOCUMENTS 4,895,910  1/1990  Isozaki et al. ...................... 525/479
4,923,945  5/1990  Isozaki et al. ...................... 525/476

Primary Examiner—Melvyn I. Marquis
Assistant Examiner—Margaret Glass
Attorney, Agent, or Firm—Armstrong, Nikaido, Marmelstein, Kubovcik & Murray

[57] ABSTRACT

Disclosed is an automotive coating composition comprising (i) a basal resin which is either (a) a copolymer containing a specific polysiloxane macromonomer having two or more functional groups selected from the class consisting of hydroxyl and alkoxy groups per molecule and a number average molecular weight of 400 to 100,000 and an oxirane group-containing vinyl monomer as comonomer units or (b) a mixture of a polymer (I) containing said polysiloxane macromonomer as an essential monomer unit and a polymer (II) containing an oxirane group-containing vinyl monomer as an essential monomer unit and (ii) a chelate compound selected from the class consisting of aluminum chelate compounds, titanium chelate compounds and zirconium chelate compounds.

9 Claims, No Drawings

AUTOMOTIVE COATING COMPOSITIONS

The present invention relates to coating compositions for automotive use.

In order to meet a recent craze for an improved finished appearance of the car and a better coating film performance and insure a uniform simultaneous finishing of the car body consisting of steel and plastic sheets at low utility cost, there is a keen demand for the development of paints which may be cured at low temperature.

The main currently available finishes for cars are polyester-melamine resin systems (solid color paints) and heat-curable acrylic resin-melamine resin systems (metallic and two-coat one-bake clear coatings) but these coatings have already been improved in surface flatness to the extent that there is no further room for improvement in view of their materials on the one hand and still have room for improvement in various cured film properties on the other hand. Furthermore, these coatings are not curable at low temperature, i.e. below about 120° C. As low temperature-curable top coatings, two-package coatings such as a polyester resin-aliphatic (or alicyclic) polyisocyanate system, a heat-curable acrylic resin-aliphatic (or alicyclic) polyisocyanate system, etc. are known but these coatings are disadvantageous in that the two components must be mixed together immediately prior to use and that they require an exclusive two-package coating equipment. Furthermore, isocyanate type curing agents have the well-known toxicity problem. With an aliphatic isocyanate, the decomposition of the residual isocyanate group by moisture and the yellowing of the coated film due to formation of a primary amine are inevitable.

In the field of intermediate coatings for cars, too, there is a keen demand for the development of a coating composition which would be curable at low temperature, provide a smooth surface and an improved coverage with a high solids content. Currently popular in the market for automotive intermediate coatings is a polyester resin-melamine resin system but as far as this type of coating is concerned, it is generally difficult to achieve further improvements in film flatness and solids content and, moreover, the curing temperature required is about 120° C. at lowest. In the case of intermediate coatings, too, a isocyanate-curing two package system would permit low-temperature curing but then, just as in the case of top coatings, require an exclusive coating equipment and be not free from the toxicity problem associated with the curing agent.

It is an object of this invention to provide a low temperature-curing automotive coating composition which insures a satisfactory finished appearance as well as improved film properties.

It is another object of this invention to provide a stable one-package coating composition which can be used for top coating or intermediate coating in the automotive finishing process.

It is a further object of the invention to provide an automotive coating composition with a high-solids content.

Other objects and advantages of this invention will become apparent as the following description proceeds.

SUMMARY OF THE INVENTION

This invention relates to an automotive coating composition comprising (i) 100 parts by weight of a basal resin which is either (a) a copolymer containing a polysiloxane macromonomer having two or more functional groups selected from the class consisting of hydroxyl and alkoxy groups per molecule and a number average molecular weight of 400 to 100,000 as obtainable by reacting 70 to 99,999 mole percent of a compound (A) of the general formula:

wherein $R_1$ is an aliphatic hydrocarbon group of 1 to 8 carbon atoms or a phenyl group; $R_2$, $R_3$ and $R_4$ independently mean an alkoxy group of 1 to 4 carbon atoms or a hydroxyl group with 30 to 0.001 mole percent of a compound (B) of the general formula

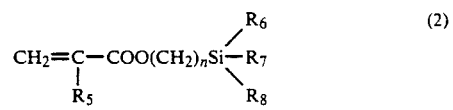

wherein $R_5$ is a hydrogen atom or a methyl group; $R_6$, $R_7$ and $R_8$ independently mean a hydroxyl group, an alkoxy group of 1 to 4 carbon atoms or an aliphatic hydrocarbon group of 1 to 8 carbon atoms; provided, however, that all of $R_6$, $R_7$ and $R_8$ are not aliphatic hydrocarbon groups of 1 to 8 carbon atoms; n is an integer equal to 1 to 6, inclusive, and an oxirane group-containing vinyl monomer as comonomer units or (b) a mixture of a polymer (I) containing said polysiloxane macromonomer as an essential monomer unit and a polymer (II) containing an oxirane group-containing vinyl monomer as an essential monomer unit and (ii) 0.1 to 30 parts by weight of a chelate compound selected from the class consisting of aluminum chelate compounds, titanium chelate compounds and zirconium chelate compounds.

In a further aspect, this invention provides an automotive coating composition comprising the above-mentioned coating composition and 5 to 60 parts by weight, based on 100 parts by weight of said basal resin, of a low molecular weight compound containing at least two oxirane groups per molecule and having a number average molecular weight of not more than 2,000.

More particularly, the automotive coating composition of this invention comprises a basal resin which is either a vinyl copolymer containing a polysiloxane macromonomer having at least two free functional groups such as hydroxyl, alkoxy, etc. and an oxirane group-containing vinyl monomer as comonomer units or a mixture of a polymer containing said polysiloxane macromonomer as an essential monomer unit with a polymer containing an oxirane group-containing vinyl monomer as an essential monomer unit and at least one chelate compound selected from the class consisting of respective chelate compounds of aluminum, titanium and zirconium. In this system, the silanol groups existing in the polysiloxane macromonomer or derived by hydrolysis of the alkoxy groups in said macromonomer and the oxirane groups from the oxirane group-containing vinyl monomer act as crosslinking functional groups to cause the curing reaction to proceed, on the surface and in the interior almost at the same time, even at a low temperature not exceeding 100° C., with a diminished difference in the degree of curing between the surface and interior of the cured product. As such, the composition can be used with advantage in automotive top coating or intermediate coating applications.

Furthermore, when a low molecular weight compound containing at least two oxirane groups per molecule and having a number average molecular weight of not more than 2,000 is further incorporated in the above coating composition, a high-solids coating material insuring uniform curing and providing a smooth and flat film surface is easily obtained.

The basal resin in the automotive coating composition of this invention is a copolymer containing a polysiloxane macromonomer obtainable by reacting a compound (A) of the general formula:

 (1)

wherein $R_1$, $R_2$, $R_3$ and $R_4$ are as defined hereinbefore with a compound (B) of the general formula:

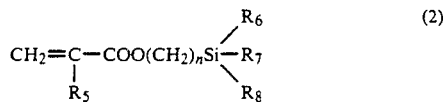 (2)

wherein $R_5$, $R_6$, $R_7$, $R_8$ and n are as defined hereinbefore and an oxirane group-containing vinyl monomer as comonomer units or a mixture of a polymer (I) containing said polysiloxane macromonomer as an essential monomer unit and a polymer (II) containing an oxirane group-containing vinyl monomer as an essential monomer unit.

The above-mentioned polysiloxane macromonomer has a main skeleton structure of siloxane bonds and, as attached to its Si atom, either directly or indirectly, has an aliphatic hydrocarbon group, phenyl group, hydroxyl group, alkoxy group, polymerizable unsaturated bond and/or the like.

Referring to the above compound (A), $R_1$ means an aliphatic hydrocarbon group of 1 to 8 carbon atoms or a phenyl group; $R_2$, $R_3$ and $R_4$ independently mean an alkoxy group of 1 to 4 carbon atoms or a hydroxyl group. $R_2$, $R_3$ and $R_4$ may be the same or different.

Referring, further, to compound (A), said alkoxy group of 1 to 4 carbon atoms may be a straight-chain or branched alkoxy group such as methoxy, ethoxy, propoxy, butoxy, etc. and said aliphatic hydrocarbon group of 1 to 8 carbon atoms is a straight-chain or branched aliphatic hydrocarbon group such as methyl, ethyl, propyl, butyl, pentyl, hexyl, heptyl, octyl and so on.

Referring, further, to compound (A), $R_1$ is preferably methyl or phenyl. Preferred examples of $R_2$, $R_3$ and $R_4$ are methoxy, ethoxy, propoxy, butoxy and hydroxyl. Thus, as preferred species of compound (A), there may be mentioned methyltrimethoxysilane, phenyltrimethoxysilane, butyltrimethoxysilane, methyltriethoxysilane, methyltributoxysilane, phenyltrisilanol, methyltrisilanol and so on. Among these compounds, methyltrimethoxysilane, phenyltrimethoxysilane and phenyltrisilanol are particularly desirable. Compounds (A) can be used independently or in combination.

Referring to compound (B), $R_5$ means a hydrogen atom or a methyl group and $R_6$, $R_7$ and $R_8$ independently mean a hydroxyl group, an alkoxy group of 1 to 4 carbon atoms or an aliphatic hydrocarbon group of 1 to 8 carbon atoms. The symbol n represents an integer equal to 1 to 6, inclusive. $R_6$, $R_7$ and $R_8$ may be the same or different but all are not aliphatic hydrocarbon groups of 1 to 8 carbon atoms.

As the aliphatic hydrocarbon group of 1 to 8 carbon atoms and the alkoxy group of 1 to 4 carbon atoms in compound (B), the specific respective groups mentioned for compound (A) can be used by way of example. Particularly useful species of $R_6$, $R_7$ and $R_8$ are methoxy, ethoxy and hydroxyl. The interger n is preferably in the range of 2 to 4. As specific examples of compound (B), there may be mentioned γ-methacryloxypropyltrimethoxysilane, γ-methaoryloxypropyltriethoxysilane, γ-acryloxypropyltrimethoxysilane, γ-methacryloxybutyltriethoxysilane, γ-acryloxypropyltrisilanol, γ-acryloxypropylmethyldimethoxysilane, γ-methacryloxypropylmethyldimethoxysilane and so on. Among these compounds, γ-methacryloxypropyltrimethoxysilane, γ-methacryloxypropyltriethoxysilane, γ-acryloxypropyltrisilanol, γ-acryloxypropylmethyldimethoxysilane and γ-methacryloxypropylmethyldimethoxysilane are especially useful. These compounds (B) can be used independently or in combination.

The polysiloxane macromonomer to be used in the present invention can be prepared by reacting compound (A) with compound (B). Based on the total amount of (A) and (B), compound (A) is used in a proportion of 70 to 99.999 mole %, preferably 90 to 99.9 mole % and more desirably 95 to 99 mole %, while compound (B) is used in a proportion of 30 to 0.001 mole %, preferably 10 to 0.1 mole % and more desirably 5 to 1 mole %. When the proportion of compound (A) is less than 70 mole %, gelation is liable to take place in the course of copolymerization, while the use of compound (A) in excess of 99.999 mole % results in an increased residue of un-copolymerized polysiloxane and, hence, undesirable turbidity in the resin solution.

The reaction of compounds (A) and (B) occurs as the hydroxyl groups in the two compounds and/or the hydroxyl groups resulting from hydrolysis of the alkoxy groups contained in the two compounds undergo dehydrative condensation. Depending on the reaction conditions, dealcoholization may occur in addition to the dehydration reaction.

While this reaction takes place in the absence of a solvent, it is preferable to conduct the reaction in an organic solvent, in which both compounds (A) and (B) are soluble, or in water.

Preferred examples of said organic solvent include hydrocarbon solvents such as heptane, toluene, xylene, octane, mineral spirit, etc., ester solvents such as ethyl acetate, n-butyl acetate, isobutyl, acetate methylcellosolve acetate, Butyl Carbitol acetate, etc., ketone solvents such as methyl ethyl ketone, methyl isobutyl ketone, diisobutyl ketone, etc.; alcohol solvents such as ethanol, isopropyl alcohol, n-butanol, sec-butanol, isobutyl alcohol, etc., and ether solvents such as n-butyl ether, dioxane, ethylene glycol monomethyl ether, ethylene glycol monoethyl ether and so on. These solvents can be used independently or in combination.

When reacted in solution, the total concentration of compounds (A) and (B) is preferably not less than 5 weight percent.

The reaction between compounds (A) and (B) is conducted generally at a temperature of about 20 to 180° C. and preferably at about 50 to 120° C. The reaction time is generally about 1 to 40 hours.

If necessary, a polymerization inhibitor may be added to this reaction system. The use of a polymerization inhibitor is effective in preventing the polymerization involving unsaturated bonds in compound (B) during the reaction between (A) and (B). Specific examples of said polymerization inhibitor are hydroquinone and hydroquinone monomethyl ether.

In this reaction between (A) and (B) for the production of said polysiloxane macromonomer, a tetraalkoxysilane and/or dialkyldialkoxysilane compound may be added to the reaction system at a level not exceeding about 20 mole percent based on the total amounts of compounds (A) and (B).

The reaction between compounds (A) and (B), where all of $R_2$, $R_3$, $R_4$, $R_6$, $R_7$ and $R_8$ are hydroxyl groups, is preferably carried out by the dehydrative condensation method using an organic solvent under heating and stirring.

When compound (A) and/or compound (B) has alkoxy groups attached to Si, it is preferable to hydrolyze the alkoxy groups prior to condensation reaction. The hydrolysis and condensation reactions can be conducted in a continuous sequence generally in the presence of water and a catalyst with heating and stirring. While the amount of water is not so critical, it is preferably not less than 0.1 mole per mole of alkoxy group. If the proportion is less than about 0.1 mole, the rate of reaction between the two compounds may be decreased. It is most desirable to use a large excess of water as the solvent. The use of water and a water-soluble organic solvent in combination may prove advantageous in cases where a sparingly water-soluble alcohol is produced as a result of condensation, for it will help homogenize the reaction system. As said water-soluble organic solvent, the alcohol, ester, ether and ketone solvents mentioned hereinbefore can be used with advantage. As the catalyst for this hydrolysis reaction, an acid or a basic catalyst can be employed. The acid catalyst may for example be hydrochloric acid, sulfuric acid, phosphoric acid, formic acid, acetic acid, propionic acid, acrylic acid or methacrylic acid, while the basic catalyst may for example be sodium hydroxide, triethylamine or ammonia. The proportion of the catalyst, based on the total amount of compounds (A) and (B), is about 0.0001 to 5 weight percent and preferably about 0.01 to 0.1 weight percent.

The polysiloxane macromonomer to be used in the present invention has a number average molecular weight of about 400 to 100,000 and preferably about 1,000 to 20,000. If the number average molecular weight is less than about 400, there will be an increased tendency of gelation during copolymerization. Conversely, when the number average molecular weight exceeds about 100,000, a tendency of decrease in compatibility is noted.

The main skeleton structure of the polysiloxane macromonomer formed by reaction of compounds (A) and (B) is made up of siloxane bonds and is mostly linear, ladder-like, or of linear-ladder mixed type. From the standpoint of water resistance, heat resistance, light resistance, etc., it is preferable to use a macromonomer having a ladder-like structure or a mixed structure which abounds in the ladder-like configuration. The desired skeletal geometry can be obtained by varying the mixing ratio of compound (A) to compound (B), the proportions of water, acid catalyst and the like. This polysiloxane macromonomer is such that the Si atoms of its siloxane bonds have been attached to groups such as $R_1$ through $R_4$,

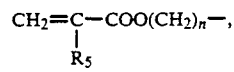

$R_6$ through $R_8$ or the like and contains in each molecule at least two free functional groups, i.e. hydroxyl and/or $C_{1-4}$ alkoxy groups attached to Si (that is to say, silanol and/or alkoxysilane groups).

Furthermore, this polysiloxane macromonomer preferably contains an average of 0.2 to 1.9, more desirably 0.6 to 1.4, and most desirably 0.9 to 1.2 polymerizable unsaturated bonds per molecule. If the polymerizable unsaturated bonds are too few, the copolymerization reaction product of the macromonomer with the vinyl monomer tends to cause a turbidity, while an excess of polymerizable unsaturated bonds tends to cause gelation during the copolymerization reaction.

The number of unsaturated bonds in the macromonomer can be determined by the following procedure.

(1) Various polysiloxane macromonomers are synthesized by varying the relative amounts of compounds (A) and (B) under otherwise the same reaction conditions.

(2) Each of the macromonomers is reacted with varying proportions of a nonfunctional vinyl monomer to prepare various vinyl copolymers.

(3) The molecular weight distribution of each vinyl copolymer is determined by gel permeation chromatography (G.P.C.)

(4) The macromonomer is regarded as having an average of one polymerizable unsaturated bond when the following conditions are satisfied. Thus, even when the proportions of the macromonomer and nonfunctional vinyl monomer are varied, the peak molecular weight (the molecular weight accounting for the largest area under the distribution curve) of the resulting copolymer is substantially unchanged and the molecular weight distribution is monodisperse, i.e. having a single peak, without a low molecular component peak (a macromonomer free from unsaturated bond) or a high molecular component peak (a copolymer of the macromonomer with two or more unsaturated bonds).

(5) As to other macromonomers, the average number of bound saturated bonds in the macromonomer can be determined by the following formula:

$$\frac{[B]/[A]}{[B_1]/[A_1]}$$

where [A] is the number of moles of compound (A), [B] is the number of moles of compound (B), [A₁] is the number of moles of compound (A) which gives a macromonomer having an average of 1 polymerizable double bond, and [B₁] is the corresponding number of moles of compound (B).

By way of illustration, assuming that a macromonomer having one polymerizable unsaturated bond is obtained at the compound (B)/compound (A) ratio of 1/20 (mole ratio), a macromonomer with an average of 0.9 polymerizable unsaturated bonds is obtained when compound (B)/compound (A) is 0.9/20.

The oxirane group-containing vinyl monomer, which is another monomer unit to be employed in this invention, includes compounds of the following general formulas, among others.
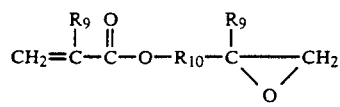  (3)
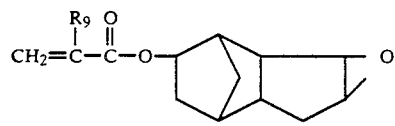  (4)
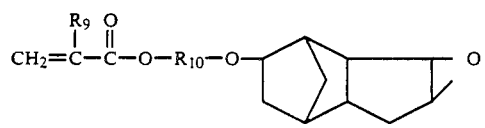  (5)
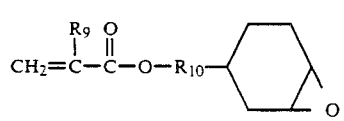  (6)
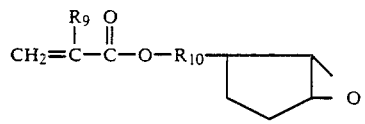  (7)
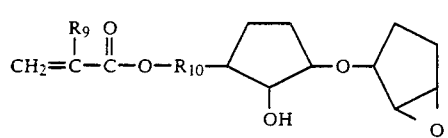  (8)
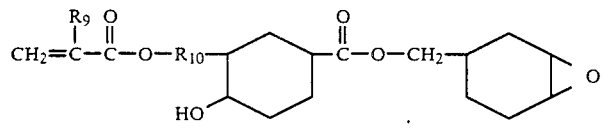  (9)
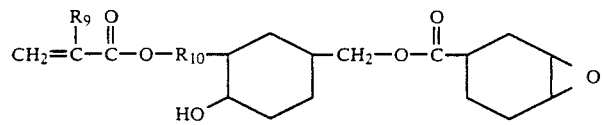  (10)
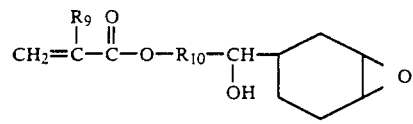  (11)
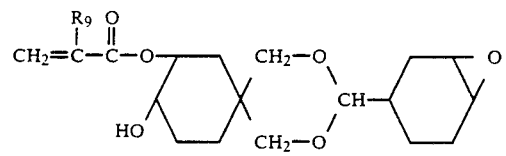  (12)
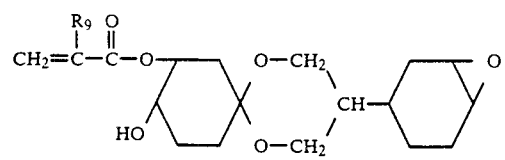  (13)

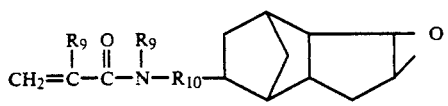 (14)

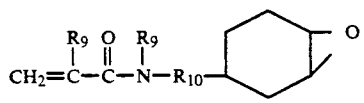 (15)

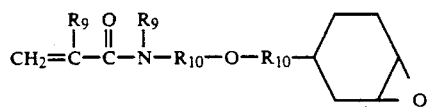 (16)

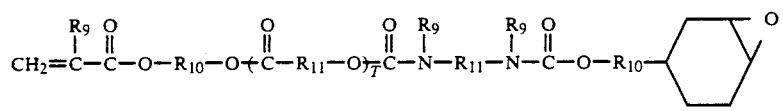 (17)

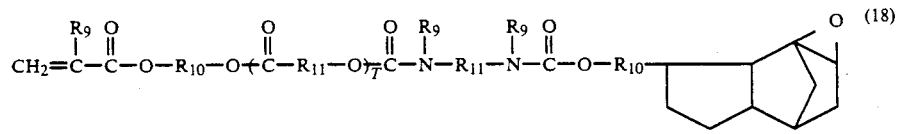 (18)

In the above respective general formulas, $R_9$ means a hydrogen atom or a methyl group; $R_{10}$ means a divalent aliphatic saturated hydrocarbon group of 1 to 6 carbon atoms; $R_{11}$ means a divalent hydrocarbon group of 1 to 10 carbon atoms, and T means an integer equal to 0 to 10, inclusive.

Among those oxirane group-containing vinyl monomers, the use of alicyclic oxirane group-containing vinyl monomers is preferred from the standpoint of curing property.

As examples of the above divalent aliphatic saturated hydrocarbon groups of 1 to 6 carbon atoms, straight-chain or branched alkylene groups such as methylene, ethylene, propylene, tetramethylene, ethylethylene, pentamethylene, hexamethylene, etc. can be mentioned. As examples of the divalent hydrocarbon group containing 1 to 10 carbon atoms, there may be mentioned methylene, ethylene, propylene, tetramethylene, ethylethylene, pentamethylene, hexamethylene, polymethylene,

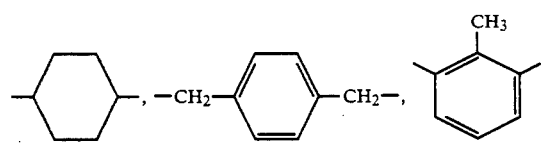

and so on.

The basal resin to be used in the coating composition of the present invention is a vinyl copolymer comprising the above-mentioned polysiloxane macromonomer and oxirane group-containing vinyl monomer as comonomer units. In addition to the above comonomer units, this copolymer may contain other polymerizable vinyl monomers as comonomer units.

Such other polymerizable vinyl monomers can be selected from a broad range of compounds according to the desired coating characteristics. Typical examples of such unsaturated monomers are shown below.

(a) Esters of acrylic acid or methacrylic acid: $C_{1-18}$ alkyl esters such as methyl acrylate, ethyl acrylate, propyl acrylate, isopropyl acrylate, butyl acrylate, hexyl acrylate, octyl acrylate lauryl acrylate, methyl methacrylate, ethyl methacrylate, propyl methacrylate, isopropyl methacrylate, butyl methacrylate, hexyl methacrylate, octyl methacrylate, lauryl methacrylate, $C_{2-18}$ alkoxyalkyl ester such as methoxybutyl acrylate, methoxybutyl methacrylate, methyxyethyl acrylate, methoxyethyl methacrylate, ethoxybutyl acrylate, ethoxybutyl methacrylate, etc.; $C_{2-8}$ alkenyl esters such as allyl acrylate, allyl methacrylate, etc.; hydroxy-$C_{2-8}$ alkyl esters such as hydroxyethyl acrylate, hydroxyethyl methacrylate, hydroxypropyl acrylate, hydroxypropyl methacrylate, etc.; (meth)acrylic acid hydroxyalkyl ester-ε-caprolactone adducts such as Placcel FA-1, Placcel FA-3, Placcel FM-1 and Placcel FM-3 (all are trademarks of Daicell Co., Ltd.), $C_{3-18}$ alkenyloxyalkyl ester such as allyloxyethyl acrylate, allyloxyethyl methacrylate and so on.

(b) Vinyl-aromatic compounds: styrene, α-methylstyrene, vinyltoluene, p-chlorostyrene and the like.

(c) Polyolefin compounds: Butadiene, isoprorene, chloroprene and so on.

(c) Others: acrylonitrile, methacrylonitrile, methyl isopropenyl ketone, vinyl acetate, VeoVa monomers (Sheil Chemical), vinyl propionate, vinyl pivalate and so on.

In the vinyl copolymer containing said polysiloxane macromonomer and oxirane group-containing vinyl monomer as comonomer units, which is to be used as the basal resin in the coating composition of this invention, the proportions of the comonomers for top coating are 1 to 70 weight percent, preferably 5 to 50 weight percent, of polysiloxane macromonomer, 2 to 70 weight percent, preferably 5 to 50 weight percent, of oxirane group-containing vinyl monomer, and 0 to 97 weight %, preferably 0 to 90 weight percent, of other polymerizable vinyl monomer. If the proportion of polysiloxane macromonomer is less than 1 weight %, the cured film will be inadequate in scratch resistance, solvent resistance, water resistance and weatherability characteristics, while the physical properties of the cured film will not be satisfactory if the polysiloxane macromonometer is used in a proportion over 70 weight percent. If the proportion of oxirane group-containing vinyl monomer is less than 2 weight percent, the scratch resistance, solvent resistance, water resistance and hardness of the cured film will not be fully satisfactory. On the other hand, if the proportion exceeds 70 weight percent, the physical properties of the cured film will not be fully satisfactory.

For use as an intermediate coating material, the vinyl copolymer should contain as comonomer units 0.5 to 50 weight percent, preferably 1 to 40 weight percent, of polysiloxane macromonomer, 2 to 70 weight percent, preferably 5 to 50 weight percent, of oxirane group-containing vinyl monomer, and 0 to 97 weight percent, preferably 0 to 90 weight percent, of other polymerizable vinyl monomer. If the proportion of polysiloxane macromonomer is less than 0.5 weight percent, the cured film will not be satisfactory in image gloss, impact resistance and chipping resistance, while the adhesivity to the top coat will not be as good as desired if the proportion of polysiloxane macromonomer exceeds 50 weight percent. On the other hand, if the proportion of oxirane group-containing vinyl monomer is less than 2 weight percent, the cured film will not be as satisfactory as desired in image gloss, impact resistance and chipping resistance, while the physical properties of the cured film will not be as good as desired if the proportion of said vinyl monomer exceeds 70 weight percent. As to the other polymerizable monomer or monomers, it is preferable, from the standpoint of curing effect, that a hydroxyl group-containing monomer is incorporated in a proportion of 5 to 30 weight percent based on the total monomer.

The above copolymer can be prepared by the same techniques as those used in the synthesis of usual acrylic resins and vinyl resins. As an example of such synthestic technology, there may be shown a process which comprises dissolving or dispersing the respective component monomers in an organic solvent and heating the solution in the presence of a radical polymerization initiator at a temperature of about 60 to 180° C. with constant stirring. The reaction time may generally be about 1 to 10 hours. As the organic solvent, the same alcohol, ether, ester, and hydrocarbon solvents as mentioned hereinbefore can be employed, for instance. In the case of a hydrocarbon solvent, it is preferably used in combination with a different type of solvent from the standpoint of solubility. As the radical polymerization initiator, any of the initiators commonly used in the art can be utilized. As examples, there may be mentioned various peroxides such as benzoyl peroxide, t-butyl peroxy-2-ethylhexanonate, etc., azo compounds such as axobisisobutyronitrile, axobisdimethylvaleronitrile and so on.

The number average molecular weight of the above copolymer is preferably in the range of about 3,000 to 30,000 and more desirably in the range of about 5,000 to 20,000.

When the coating composition is used as an automotive top coating, the cured film will not as good as desired in scratch resistance, hardness, solvent resistance and water resistance if the number average molecular weight of the copolymer is less than 3,000, while the image gloss of the film will not be as good as desired if the number average molecular weight exceeds 30,000.

For intermediate coating purposes, if the number average molecular weight of the copolymer is less than 3,000, the coating layer will swell on application of the top coat to detract from the image gloss of the top coat. On the other hand, if the number average molecular weight exceeds 30,000, the solids content of the composition may be not increased, with the result that the coverage will not be sufficient to insure an adequate surface flatness.

As the basal resin in the coating composition of this invention, the above-mentioned copolymer comprising a polysiloxane macromonomer and an oxirane group-containing vinyl monomer may be replaced with a mixture of a polymer (I) containing said polysiloxane macromonomer as an essential monomer unit and a polymer (II) containing an oxiran group-containing vinyl monomer as an essential monomer unit.

As the polymer (I) containing a polysiloxane macromonomer as an essential monomer unit, which is used in the above-mentioned mixture of polymer (I) and (II), there can be employed a homopolymer of said polysiloxane macromonomer or a copolymer of said polysiloxane macromonomer with another polymerizable vinyl monomer. The polymerizable vinyl monomer can be selected from a broad range of compounds according to the desired film properties. For example, the same polymerizable vinyl monomers as those which have been mentioned hereinbefore for optional incorporation in the copolymer comprising said polysiloxane macromonomer and oxiran group-containing vinyl monomer can be employed. The said other polymerizable vinyl monomer or monomers which can be used in the production of the copolymer of polysiloxane macromonomer can be used in a proportion of 5 to 99 weight percent, preferably 30 to 90 weight percent, based on the nonvolatile matter of the copolymer. In addition to the above-mentioned vinyl monomers, such other monomers as unsaturated monomers of monocarboxylic acids, e.g. acrylic acid, methacrylic acid, crotonic acid, etc., and those of dicarboxylic acids (such as fumaric acid, maleic acid, itaconic acid, etc.), inclusive of the corresponding anhydrides and/or anhydride monesters, can be incorporated in proportions not more than 10 weight percent and not more than 5 weight percent, respectively, based on the nonvolatile manner of the copolymer.

As the polymer (II) containing an oxirane group-containing vinyl monomer as an essential monomer unit, which is the other component of said polymer mixture, there may be mentioned a homopolymer of the oxirane group-containing vinyl monomer or a copolymer of the oxirane-group containing vinyl monomer with one or more other polymerizable vinyl monomers such as those mentioned hereinbefore. As the oxirane group-containing vinyl monomer, any of the vinyl monomers of general formulas (3) through (18) can be employed.

The proportion of said oxirane group-containing vinyl monomer is generally about 3 to 100 weight percent and preferably about 20 to 100 weight percent based on the polymer (II). If the proportion is less than about 3 weight percent, the hardness of the cured film will not be as good as desired.

The above polymers (I) and (II) can be prepared by the same technique as that used in the synthesis of acrylic resins and vinyl resins.

As an example of such synthetic technology, there may be mentioned a process which comprises dissolving or dispersing the respective component monomers in an organic solvent and heating the solution or dispersion in the presence of a radical polymerization initiator at a temperature of about 60 to 180° C. with constant stirring. The reaction time may generally be about 1 to 10 hours. As the organic solvent, the same alcohol, ether, ester and hydrocarbon solvents as mentioned hereinbefore can be employed, for instance. In the case of a hydrocarbon solvent, it is preferably used in combination with a different type of solvent from the standpoint of solubility. As the radical polymerization initiator, any of the initiators commonly used in the art can be utilized. As examples, there may be mentioned various peroxides such as benzoyl peroxide, t-butyl peroxy-2-ethylhexanonate, etc., azo compounds such as azobisisobutyronitrile, azobisdimethylvaleronitrile and so on.

The number average molecular weight of the above polymer is preferably in the range of about 3,000 to 200,000 and more desirably in the range of about 10,000 to 80,000.

Based on the total amount of polymer (I) and polymer (II), 5 to 95 weight percent of polymer (I) is mixed with 95 to 5 weight percent of polymer (II). If the proportion of polymer (I) is less than 5 percent by weight or that of polymer (II) exceeds 95 weight percent, the curing performance of the composition is sacrificed. Conversely, when the proportion of polymer (I) exceeds 95 weight percent or that of polymer (II) is less than 5 weight percent, the physical properties of the cured film are adversely affected and the defect of shrinkage tends to develop.

As the crosslinking agent, at least one of chelate compounds of aluminum, titanium or zirconium is employed in the present invention. Preferred is a chelate compound containing a compound which shows keto-enol tautomerism as a ligand forming a stable chelate ring.

As examples of said compound which shows keto-enol tautomerism, there may be mentioned $\beta$-diketones (acetylacetone etc.), acetoacetic acid esters (methyl acetoacetate etc.), malonic acid esters (ethyl malonate etc.), ketones having a hydroxyl group in the $\beta$-position (diacetone alcohol etc.), aldehydes having a hydroxyl group in the $\beta$-position (salicylaldehyde etc.), esters having a hydroxyl group in the $\beta$-position (methyl salicylate etc.) and so on. Particularly desirable results are obtained when acetoacetic esters and $\beta$-diketones are employed.

The aluminum chelate can be easily prepared by mixing generally one mole equivalent of an aluminum alkoxide of the general formula

(19)

wherein all occurrences of $R_{12}$ may be the same or different and each means an alkyl group of 1 to 20 carbon atoms or an alkenyl group with about 1 to 3 mole equivalents of a compound which, as aforesaid, shows keto-enol tautomerism, if necessary with heating.

As examples of the above-mentioned alkyl group of 1 to 20 carbon atoms, there may be mentioned methyl, ethyl, n-propyl, isopropyl, n-butyl, isobutyl, sec-butyl, tert-butyl, pentyl, hexyl, heptyl, octyl, nonyl, decyl, undecyl, dodecyl, tridecyl, tetradecyl, octadecyl and so on. As examples of said alkenyl group, there may be mentioned vinyl, allyl and so on.

As examples of the aluminum alkoxide of general formula (19), there may be mentioned aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide and so on. Particularly preferred are aluminum triisopropoxide, aluminum tri-sec-butoxide and aluminum tri-n-butoxide.

The titanium chelate can be prepared, for example by mixing generally one mole equivalent, as titanium, of a titanate compound of the general formula

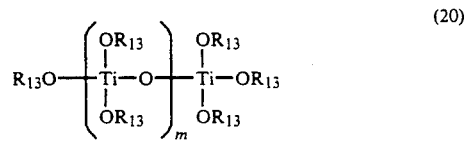
(20)

wherein m is an integer equal to 0 to 10, inclusive, and all occurrences of $R_{13}$ may be the same or different and each means an alkyl group of 1 to 20 carbon atoms or an alkenyl group with about 1 to 4 mole equivalents of a compound which, as aforesaid, shows keto-enol-tautomerism, if necessary with heating. The above-mentioned alkyl group of 1 to 20 carbon atoms and alkenyl group may be the same as those mentioned hereinbefore.

As examples of the titanate of general formula (20) wherein m is equal to 0, there may be mentioned, among others, tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and so on. Particularly useful are tetraisopropyl titanate, tetra-n-butyl titanate, tetraisobutyl titanate and tetra-tert-butyl titanate. As to the titanate of general formula (20) wherein m is 1 or more, the dimers to undecamers (m = 1 to 10) of tetraisopropyl titanate, tetra-n-butyl titanate, tetraisobutyl titanate or tetra-tert-butyl titanate are preferred.

The zirconium chelate can be prepared, for example by mixing generally one mole equivalent, as zirconium, of a zirconate compound of the general formula:

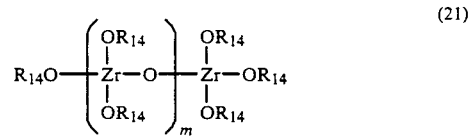
(21)

wherein m is an integer equal to 0 to 10 and all occurrences of $R_{14}$ may be the same or different and each means an alkyl group of 1 to 20 carbon atoms or an alkenyl group with about 1 to 4 mole equivalent of said compound which shows keto-enol-tautomerism, if necessary with heating. The alkyl group of 1 to 20 carbon atoms or alkenyl group is as defined hereinbefore.

As examples of the zirconate of general formula (21) wherein m is equal to 0, there may be mentioned tetraethyl zirconate, tetra-n-propyl zirconate, tetraisopropyl zirconate, tetraisobutyl zirconate, tetra-n-butyl zirconate, tetra-sec-butyl zirconate, tetra-tert-butyl zirconate, tetra-n-pentyl zirconate, tetra-tert-pentyl zirconate, tetra- tert-hexyl zirconate, tetra-n-heptyl zirconate, tetra-n-octyl zirconate, tetra-n-stearyl zirconate and so on. Particularly preferred are tetraisopropyl zirconate, tetra-n-propyl zirconate, tetraisobutyl zirconate, tetra-n-butyl zirconate, tetra-sec-butyl zirconate and tetra-tert-butyl zirconate. As to the zirconate of general formula (21) wherein m is equal to 1 or more, the dimers to undecamers (m = 1 to 10) of tetraisopropyl zirconate, tetran-propyl zirconate, tetra-n-butyl zirconate, tetra-isobutyl zirconate, tetra-sec-butyl zirconate or tetra-ter-butyl zirconate are preferred. The zirconium chelate compound may contain an association of such zirconates as a constituent unit.

Among preferred chelate compounds for purposes of this invention are such aluminum chelate compounds as tris(ethyl acetoacetate)aluminum, tris(n-propylacetoacetate)aluminum, tris(iso-propylacetoacetate)aluminum, tris(n-butylacetoacetate)aluminum, isopropoxybis(ethylacetoacetate)aluminum, diisopropoxyethylacetoacetatealuminum, tris-(acetylacetonato)aluminum, tris(propionylacetonato)aluminum, diisopropoxypropionylacetonatoaluminum, acetylacetonatobis(propionylacetonato)aluminum, monoethylacetoacetatebis-(acetylacetonato)aluminum, monoacetylacetonatobis(ethylacetoacetate)aluminum, etc., such titanium chelate compounds as diisopropoxybis(ethylacetoacetate)-titanium, diisopropoxybis(acetylacetonato)titanium, diisopropoxybis(acetylacetonato)titanium, etc., and such zirconium chelate compounds as tetrakis-(acetylacetonatoe)zirconium, tetrakis(n-propylacetoacetate)zirconium, tetrakis(ethylacetoacetate)zirconium and so on.

As the chelate compound to be used as a crosslinking agent in the present invention, the above-mentioned respective chelate compounds of aluminum, zirconium and titanium can be used either singly or in combination.

The proportion of such chelate compound in the coating composition of this invention is 0.1 to 30 parts by weight and preferably 0.1 to 15 parts by weight based on 100 parts by weight of the basal resin which is either a vinyl copolymer comprising said polysiloxane macromonomer and oxirane group-containing vinyl monomer or a mixture of said polymers (I) and (II). If the proportion of the crosslinking chelate compound is below the lower limit of the above range, the crosslinkability tends to be low, while the use of the chelate compound in excess of the above range will give residues of the same compound to render the cured film less resistant to water.

In the coating composition of this invention, there may be incorporated, if necessary, a low molecular weight compound containing at least 2, preferably 2 to 16, and more desirably 2 to 10 oxirane groups per molecule and having a number average molecular weight of not more than 2,000. This low molecular weight compound functions as a reactive diluent and, upon addition to the coating composition, reduces its viscosity and, hence, enables one to increase the solids content of the composition. Moreover, since the amount of by-products of curing is small, a high solids coating with a uniform curing performance can be obtained. Furthermore, there is only a low risk of cure shrinkage to insure the formation of a flat, smooth cured surface.

As examples of the compound containing at least two oxirane groups per molecule and having a number average molecular weight of not more than 2,000, which can be employed in the present invention, there may be mentioned various compounds of the following general formula:

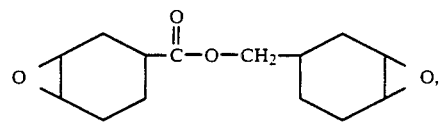

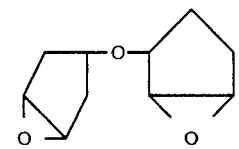

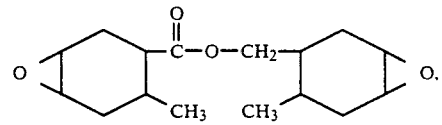

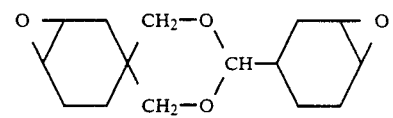

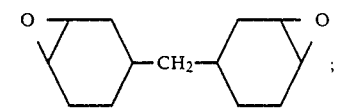

adducts of

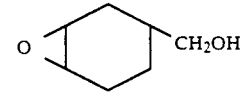

to polyisocyanate compounds (i.e. organic diisocyanates such as aliphatic diisocyanates, e.g. hexamethylene diisocyanate, trimethylhexamethylene diisocyanate, etc., alicyclic diisocyanates, e.g. hydrogenated xylylene diisocyanate, isophorone diisocyanate, etc., and aromatic diisocyanates, e.g. tolylene diisocyanate, 4,4'-diphenylmethane diisocyanate, etc., adducts of such organic diisocyanates to polyalcohols, low molecular weight polyesters, water of the like, polymers of said respective organic diisocyanates, and isocyanate biurets, etc.; representative commercial products of these compounds include Burnock D-750, -800, DN-950, -970 and 15-455 (Dainippon Ink and Chemicals Co., Ltd.), Desmodur L, NHL, IL and N3390 (Bayer A. G., West Germany), Takenate D-102, -202, 1110N and -123N (Takeda Chemical Industries, Ltd.), Coronate L, EH, and 203 (Nippon Polyeurethan Industry Co., Ltd.) and Duranate 24A-90CX (Asahi Chemical Industry Co., Ltd.) adducts of

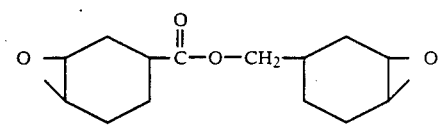

to polybasic acids; the compounds obtainable by oxidizing esters containing unsaturated groups such as

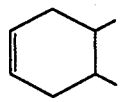

(e.g. esters obtainable by esterifying tetrahydrophthalic anhydride, trimethylolpropane, 1,4-butanediol, etc. and having a number average molecular weight of about 900) with peracetic acid or the like.

Aside from the above compounds containing alicyclic oxirane groups, compounds having non-alicyclic oxirane groups, such as diglycidyl ether, 2-glycidylphenyl glycidyl ether etc., can also be employed.

It is essential that the number average molecular weight of said low molecular weight compound containing at least two oxirane groups per molecule is not more than 2,000. If the number average molecular weight exceeds 2,000, the compatibility with the basal resin is sacrificed so that it becomes impossible to obtain a cured film with acceptable quality and properties.

The proportion of the low molecular weight compound is about 0 to 100 parts by weight and preferably about to 60 parts by weight based on 100 parts by weight of the basal resin.

If necessary, the coating composition of this invention may further contain epoxy group-containing resins such as Epikote 1001 (Shell Chemical) and/or hydroxyl group-containing resins such as styrene-allyl alcohol copolymer and so on. The total proportion of such resins is preferably not more than about 10 weight percent based on the total coating composition.

If necessary, various known additives may be incorporated in the automotive coating composition of this invention for use as a top coating or an intermediate coating material.

When the coating composition of this invention is to be used as a top coating, for example as a top solid color coating composition or a clear coating composition of two-coat one-bake system, the composition may appropriately be composed of about 100 parts by weight of said basal resin, about 0.1 to 30 parts by weight of said chelate compound, about 0 to 100 parts by weight of said low molecular weight compound containing at least two oxirane groups per molecule, and about 0 to 00 parts by weight of a pigment color. As a pigment color, any of the inorganic or organic high-weather-resistant pigments which are commonly used in automotive top coatings can be successfully employed. Thus, for example, such inorganic pigments as rutile type titanium dioxide, carbon black, etc. and such organic pigments as quinacridone pigments, e.g. quinacridone red etc., azo pigments, e.g. pigment red etc., and phthalocyanine pigments, e.g. phthalocyanine blue, phthalocyanine green etc. For use as a two-coat one-bake clear coating material, the composition of this invention is generally used without addition of a pigment color.

The preferred composition for use as a base coating composition of two-coat one-bake system or a one-coat one-bake metallic coating composition comprises about 100 parts by weight of said basal resin, about 0.1 to 30 parts by weight of said chelate compound, about 2 to 36 parts by weight of a metallic pigment, about 0 to 100 parts by weight of said low molecular weight compound containing at least two oxirane group per molecule and about 0 to 40 parts by weight of a pigment color. As said metallic pigment, any of those known metallizing pigments can be used. For example, flakely metallic powders of aluminum, copper, mica-like iron oxide, bronze, stainless steel, etc. and the pigment colors mentioned hereinbefore can be utilized. As modifying resins for use in rheology control which is carried out for improving the metallic tone by a metallic pigment series, a core-crosslink acrylic resin dispersion prepared by known non-homogeneous polymerization method, cellulose acetate butyrate or the like can be incorporated in a proportion up to about 20 parts by weight.

The coating composition of this invention to be used as an automotive intermediate coating may comprise about 100 parts by weight of said basal resin, about 0.1 to 30 parts by weight of said chelate compound, about 5 to 150 parts by weight of a pigment and about 0 to 100 parts by weight of said low molecular weight compound containing at least two oxirane groups per molecule. As the pigment mentioned just above, an inorganic pigment such as titanium dioxide, barium sulfate, calcium carbonate, clay, etc. or an organic pigment for coloring can be employed.

The coating composition of this invention can be applied, for example by electrostatic coating (the bell type, REA type, etc.), air spray coating or the like. Thus, the coating machine and coating line which have heretofore been used can be directly utilized as such.

The application viscosity of the coating composition for intermediate coating is about 15 to 35 seconds (Ford Cup No. 4, 20° C.) and that for top coating is about 12 to 30 seconds (Ford Cup No. 4, 20° C). of course, the optimum application viscosity can be selected according to the type of coating machine, kind of solvent, coating conditions and other factors.

The solvent which is used for diluting the coating material may be any of the solvents used in the conventional acrylic and melamine resin coating compositions. Thus, hydrocarbon solvents such as toluene, xylene, etc., ketone solvents such as methyl ethyl ketone, methyl isobutyl ketone, etc., ester solvents such as ethyl acetate, butyl acetate, etc., ether solvents such as dioxane, ethylene glycol diethyl ether, etc. and alcohol solvents such as butanol, propanol, etc. may be mentioned. These solvents can be used either independently or as an appropriate mixture. When an alcohol solvent is employed, however, it is preferably used in combination with a different kind of solvent in view of the solubility of the resin. From the standpoint of curing rate, it is preferable to use a solvent boiling at a temperature not more than about 150° C., although this is not a critical requirement.

The coating composition of this invention can be used as an intermediate coating and/or a top coating in a coating system in which the chemically pretreated surface of a steel sheet substrate is first coated with a primer by electrodeposition and, then, an intermediate coating (which is sometimes omitted) and a top coating are successively applied in superimposition or in a coating system in which a plastic substrate is first coated with a primer tailored to the substrate plastic material and, after drying, an intermediate coating (which is sometimes omitted) and a top coating are successively applied in superimposition.

The dry thickness of the intermediate coating of this invention is preferably about 25 to 60 μm. The dry thickness of the top coating of this invention is about 20 to 100 μm, preferably about 30 to 70 μm in the case of the one-coat one-bake solid color coating, one-coat one-bake metallic color coating or clear coating of two-coat one-bake system and about 10 to 25 μm, preferably about 10 to 20 μm, in the case of metallic base coating of two-coat one-bake system.

The baking conditions may be about 80 to 140° C. for 30 to 40 minutes but the curing reaction may be allowed to proceed at a lower temperature from room temperature to about 80° C. by prolonging the drying time. Thus, for example, the curing reaction may be brought to completion at room temperature in about 3 days.

It appears that the curing reaction of the coating composition of this invention starts with evaporation of the solvent and proceeds with evaporation of the chelating component from the crosslinking agent. The curing reaction due to the crosslinking agent seems to proceed in the following mechanism. Thus, when an organic chelate compound of aluminum is used as the crosslinking agent, the chelating agent is first evaporated off in a first phase and, then, the aluminum compound reacts with a silanol group in the polysiloxane macromonomer to give an

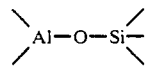

bond. In a second phase, a silanol group is coordinated with this

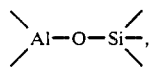

whereby the silanol group is polarized as illustrated below.

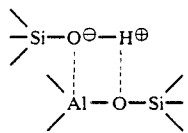

This polarized silanol group reacts with the epoxy group to form an oxonium salt as follows.

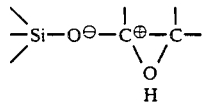

The above event is followed by ionic polymerization and addition reaction of epoxy groups to hydroxyl groups.

It is presumed that the curing reaction which takes place in the coating composition of this invention not only involves the above crosslinking reaction due to the catalytic action of the crosslinking agent but also involves various other reactions such as condensation reaction between silanol groups. Thus, for example, the following curing reactions seem to be involved.

(A) Condensation between silanol groups
(B) Condensation between a silanol group and a hydroxyl group derived from the oxirane group
(C) Addition of a silanol group to the oxirane group
(D) Addition of a hydroxy group to the oxirane group
(E) Ionic polymerization of oxirane groups When, in the coating composition of this invention, the polysiloxane macromonomer has alkoxy groups as its functional groups (that is, to say, alkoxysilane groups), hydrolysis is essential to the generation of silanol groups. Actually, this hydrolysis reaction can proceed well even in the presence of a small amount of water, for example the moisture available in the atmosphere.

The coating composition of this invention contains, in its resin component, various functional groups such as silanol groups derived from the polysiloxane macromonomer and the oxirane groups derived from the oxirane group-containing monomer, and it is because of this that the above curing reactions (A) through (E) take place in parallel. As a result, the curing occurs simultaneously on the surface and in the interior of the coat so that the gradient of cure from the surface to the interior is minimized, contributing to a reduced rate of shrinkage as a consequence.

When used as an automotive intermediate coating, the composition of this invention provides the following beneficial results.

(1) A cured film with high degrees of levelness and image gloss is obtained. Because ionic polymerization and addition reaction are predominant modes of curing reaction, with reduced chances for the formation of side reaction products, the volumetric shrinkage in the curing process is very small so that a cured film with a high degree of flatness and smoothness free from minute corrugations is obtained. Therefore, the image gloss of the top coat applied in superimposition is very satisfactory.

(2) Despite being a one-package system, the composition is well curable at low temperature. With a baking time between 30 and 40 minutes, a thorough crosslinking reaction occurs at a temperature of about 80° C.

Therefore, the composition of this invention can be used as an intermediate coating for plastic substrates for which a baking temperature over 120° C. cannot be used.

(3) Being a one-package system, the composition of this invention is stable. It is less toxic, too.

(4) It is easy to design a high-solids intermediate coating composition. The controlled molecular weight of the basal resin and the concomitant use of the low molecular weight compound containing at least two oxirane groups per molecule and having a number average molecular weight of not more than 2,000 insure an improved uniformity of cure and enable one to provide a super-high-solids coating composition with a great covering power. The presumed reasons why the coating composition of this invention insures a high uniformity of cure even at a high solids level are as follows. The low molecular weight compound in the composition acts as a reactive diluent to lower the viscosity of the composition, thus allowing its non-volatile fraction to be increased, while the basal resin is crosslinked by the concurrent ionic polymerization at the epoxy group, addition reaction of the epoxy group to the silanol group and hydroxyl group, and condensation reaction of silanol groups, with a minimum of formation of curing byproducts, with the result that there is only a small difference in the degree of curing between the surface and interior of the film, leaving substantially no uncured fraction.

For use as an automotive top coat, the coating composition of this invention insures the following desirable effects in addition to the above effects (1) through (4).

21

(5) Excellent acid resistance

There is no problem of spot, aging loss of gloss or etching due to acid rains.

(6) Excellent stain resistance

Because of the dense crosslinks and the water repellency due to the siloxane bonds in the basal resin, the film is highly repellent to various contaminants.

(7) High scratch resistance

The film is highly scratch-resistant due to the synergistic effect of the high crosslinking density and the frictional resistance lowering effect of polysiloxane in the basal resin.

(8) Excellent weatherability

The film is highly weather-resistant (immune to aging loss of gloss, cracking, chalking and blistering). The ionic polymerization of epoxy groups, addition reaction of epoxy groups to silanol and hydroxyl groups, and condensation reaction of silanol groups all occur concurrently, with a minimum of formation of side reaction products in the course of curing so that the gradient of cure between the surface and interior of the film is minimized with substantially no residue of uncured resin, thus contributing to the improved weather resistance.

This invention is described in further detail by way of the following examples.

| Production Examples I-1 Production of a polysiloxane macromonomer | |
|---|---|
| Methyltrimethoxysilane | 2720 g (20 mol) |
| γ-Methacryloxypropyltrimethoxysilane | 256 g (1 mol) |
| Deionized water | 1134 g |
| 30% Hydrochloric acid | 2 g |
| Hydroquinone | 1 g |

The above mixture was reacted at 80° C. for 5 hours. The resulting polysiloxane macromonomer had a number average molecular weight of 2,000 and contained one vinyl group (polymerizable unsaturated bond) and 4 hydroxyl groups on the average per mol.

Using the above macromonomer, copolymers were prepared.

| I-2 Production of copolymers | |
|---|---|
| (1) Copolymer-1 | |

| Polysiloxane macromonomer | 300 g |
| Glycidyl methacrylate | 100 g |
| Styrene | 100 g |
| n-Butyl methacrylate | 500 g |

22

| -continued | |
|---|---|
| I-2 Production of copolymers | |
| (1) Copolymer-1 | |
| Azobisisobutyronitrile | 30 g |

The above mixture was added dropwise to 1,000 g of xylene and polymerized at 120° C. to give a clear copolymer. This copolymer had a number average molecular weight of about 18,000.

| (2) Copolymer-2 | |
|---|---|
| Polysiloxane macromonomer | 100 g |
| 2-Hydroxyethyl acrylate | 100 g |
| 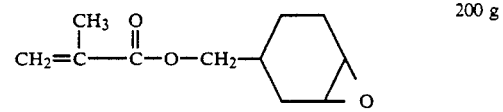 | 200 g |
| 2-Ethylhexyl methacrylate | 500 g |
| Styrene | 100 g |
| Azobisisobutyronitrile | 50 g |

The above mixture was added dropwise to 1,000 g of a 50:50 (w/w) mixture of butanol and xylene and polymerized at 120° C. to give a clear copolymer. This copolymer had a number average molecular weight of about 10,000.

| (3) Copolymer-3 | |
|---|---|
| Polysiloxane macromonomer | 150 g |
| 2-Hydroxyethyl acrylate | 100 g |
| 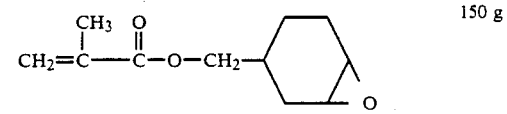 | 150 g |
| n-Butyl acrylate | 500 g |
| Styrene | 100 g |
| Azobisisobutyronitrile | 10 g |

The above mixture was polymerized in the same manner as in the production of copolymer-2. This copolymer had a number average molecular weight of about 30,000.

| (4) Copolymer-4 | |
|---|---|
| Polysiloxane macromonomer | 150 g |
| 2-Hydroxyethyl acrylate | 100 g |
| 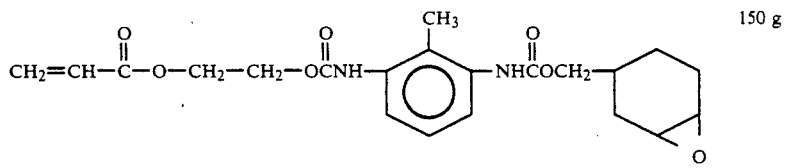 | 150 g |
| n-Butyl acrylate | 500 g |
| Styrene | 100 g |
| Azobisisobutyronitrile | 30 g |

The above mixture was polymerized as in the production of copolymer-2. The resulting clear copolymer had a number average molecular weight of about 19,000.

| (5) Copolymer 5-I | |
|---|---|
| Polysiloxane macromonomer | 600 g |
| n-Butyl acrylate | 300 g |
| Styrene | 100 g |
| Azobisisobutyronitrile | 30 g |

The above mixture was polymerized as in the production of copolymer-1. This copolymer had a number average molecular weight of about 18,000.

| (6) Copolymer 5-II | |
|---|---|
| Glycidyl methacrylate | 200 g |
| n-Butyl acrylate | 700 g |
| Styrene | 100 g |
| Azobisisobutyronitrile | 30 g |

The above mixture was polymerized as in the production of copolymer-1. The resulting copolymer had a number average molecular weight of about 18,000.

| (7) Copolymer 6-I | |
|---|---|
| Polysiloxane macromonoer | 200 g |
| 2-Ethylhexyl acrylate | 700 g |
| 2-Hydroxyethyl acrylate | 100 g |
| Azobisisobutyronitrile | 50 g |

The above mixture was polymerized as in the production of copolymer-2. The resulting copolymer had a number average molecular weight of about 10,000.

| (8) Copolymer 6-II | |
|---|---|
| 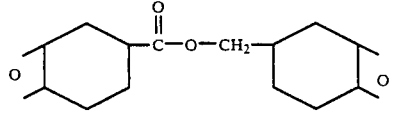 | 400 g |
| 2-Ethylhexyl acrylate | 500 g |
| 2-Hydroxyethyl acrylate | 100 g |
| Azobisisobutyronitrile | 30 g |

The above mixture was polymerized as in the production of copolymer-2. The resulting clear copolymer had a number average molecular weight of about 17,000.

EXAMPLE 1

Using the copolymers prepared in the above production examples, automotive intermediate coatings were manufactured according to the formulas shown in Table 1. In each coating composition, the pigment was dispersed with the basal resin and solvent by means of a paint shaker for 1 hour. As comparative examples, control coatings were prepared by adding 60 parts by weight, based on 100 parts by weight of nonvolatile matter, of titanium dioxide to each of the commercial oil-free polyester resin/melamine resin (Rugerbake®AM, Kansai Paint Co., Ltd., Paint No. 7) and acryl polyol/polyisocyanate low temperature-curing resin (Retan PG80, Kansai Paint Co., Ltd., Paint No. 8).

TABLE 1

| Paint No. | 1 | 2 | 3 | 4 | 5 | 6 |
|---|---|---|---|---|---|---|
| Copolymer - 1 | 70 | | | | | |
| Copolymer - 2 | | 70 | 100 | | | |
| Copolymer - 4 | | | | 70 | | |
| Copolymer - 5 - I | | | | | 35 | |
| Copolymer - 5 - II | | | | | 35 | |
| Copolymer - 6 - I | | | | | | 35 |
| Copolymer - 6 - II | | | | | | 35 |
| Oligomer A (*1) | 30 | 30 | 0 | 30 | 30 | 30 |
| tris(Acetylacetonato)-aluminum | 1 | 1 | 1 | 1 | 1 | 1 |
| Pigment (*2) | 60 | 60 | 60 | 60 | 60 | 60 |

(*1) Oligomer A: An alicyclic oxirane group-containing compound:

$$\text{(cyclohexane-O)} - \overset{O}{\underset{\|}{C}} - O - CH_2 - \text{(cyclohexane-O)}$$

(*2) Pigment: Titanium dioxide JR-602 (Teikoku Kako Co., Ltd.)

Film performance tests I

An epoxy cationic electrodeposition paint was applied to chemically pretreated dull steel sheets (dry thickness: 25 μm) and cured at 170° C. for 30 minutes to prepare substrate sheets. These sheets were spraycoated with the intermediate coating compositions of this invention and the control intermediate coating compositions, respectively, followed by curing under the two different baking conditions of 100°C.×30 minutes and 140°C.×30 minutes (cured thickness=40±5 μm).

Thereafter, an automotive polyester resin/melamine resin top paint (white, Rugerbake AM, Kansai Paint Co., Ltd.) was applied to each sheet and baked at 140° C. for 30 minutes (cured thickness=40 μm).

These testpieces were subjected to various film performance tests. The results are given in Table 2. In the pencil hardness test, xylol resistance test and image gloss test-1, the specimens before application of the top coat were used.

Test methods (*3) Pencil hardness

The coated surface of each specimen was scratched with the leads of Mitsubishi Uni pencils and the maximum lead hardness which caused no mar on the surface was recorded.

(*4) Xylol resistance

The coated surface of each testpiece was rubbed forcefully with a piece of gauze saturated with xylol under the pressure of fingers in 10 reciprocations. The results were evaluated in terms of the state of surface dissolution, injury and degree of swelling and rated on a 5-grade scale from very satisfactory (A) to very poor (E).

(*5) Image gloss-1

The evaluation was made with an image gloss meter (Suga Testing Machines Co., Ltd.). The figures in the table represent ICM values which may vary from 0 to 100%. The larger the value, the greater is the image gloss and any value not less than 80 represents a high image gloss.

In this test, the ICM values correspond to values when the surface roughness of the cationic electrodeposition-coated surface is RZ=3 μm.

The surface roughness (RZ) was measured with a contact needle roughness gauge (JIS B-0651) and expressed in average point roughness RZ (in units of μm) (JIS B-0601, 1982).

(*6) Image gloss-2

The same as image gloss-1 except that the result represents the ICM value at RZ=7 μm.

(*7) Adhesion

Scores reaching the substrate were made across the coated surface in a crisscross pattern of 100 meshes 1 mm square each. Then, a cellophane tape was applied to the surface and, then, quickly peeled off. The surface condition was evaluated and the result was expressed in the number of meshes remaining unpeeled divided by 100.

(*8) Impact resistance

The DuPont impact tester (impact core diameter 1/2 inch, weight 0.5 kg) was used. The maximum height of weight dropping which did not cause cracking was recorded.

(*9) Chipping resistance

The crushed stone ballistic tester (Suga Testing Machines Co., Ltd., JA-400) was used. The coated testpiece was mounted in vertical position on the sample holder of the testing machine and 50 grams of No. 7 crushed stone was ejected against the testpiece at right angles at a pneumatic pressure reading of 4 kg/cm$^2$ on the pressure gauge of the machine. The degree of peeling damage was evaluated and rated on a 5-grade scale from excellent (A) to poor (E).

(*10) NV content at application

The nonvolatile content (wt%) on heating after dilution with Swasol No. 1000 (Maruzen Oil Co., Ltd.) to a coating viscosity of 20 seconds (Ford Cup No. 4/20° C.). The higher the value, the greater was the covering power of the coat.

(*11) Pot life

The coating composition diluted as in (*10) (Ford Cup No. 4, 20 seconds) was covered to prevent exposure to the atmosphere and stored at 40° C. for 5 days. The result was rated on the 5-grade scale from A: a viscosity increase of less than 5 seconds through C: a viscosity increase of 10-15 seconds to E: gellation.

plied in a dry thickness of 40±5 μm and baked at 80° C. for 30 minutes. Thereafter, a top coat of Soflex No. 200 (trademark, Kansai Paint Co., Ltd., a polyester resin-/aliphatic polyisocyanate system) was applied in a dry thickness of 30 to 40 μm and baked at 80° C. for 30 minutes to prepare a testpiece. The testpieces prepared as above were tested by the same methods as film performance tests I. The results are shown in Table 3.

TABLE 3

|  |  | This invention No. 3 | Control No. 8 |
| --- | --- | --- | --- |
| Pencil hardness | (*3) | 4B | 5B |
| Xylol resistance | (*4) | B | B |
| Image gloss-1 | (*5) | 85 | 82 |
| Adherence | (*7) | 100/100 | 100/100 |
| Impact resistance | (*8) | 50 | 50 |
| Chipping resistance | (*9) | B | B |
| NV content at application | (*10) | 58 | 52 |
| Pot life | (*11) | A | E |

EXAMPLE 2

Using the copolymers prepared in Production Examples, automotive top coating compositions were manufactured according to the formulations shown in Table 4.

For use as top coating compositions, (1) solid color coating compositions (white), (2) base coating composition (silver) of two-coat one-bake system (2ClB) and (3) clear coating compositions of 2ClB were prepared. The dispersion of titanium dioxide into each copolymer was carried out with a paint shaker for 1 hour.

The proportion of the pigment was 80 parts by weight based on 100 parts by weight of the nonvolatile matter of the resin in the case of the solid color coating composition and 13 parts by weight (as aluminum pigment) on the same basis in the case of the two-coat one-bake base coating composition.

TABLE 2

|  |  | Heating conditions | This invention | | | | | | Control | |
| --- | --- | --- | --- | --- | --- | --- | --- | --- | --- | --- |
|  |  |  | No. 1 | No. 2 | No. 3 | No. 4 | No. 5 | No. 6 | No. 7 | No. 8 |
| Pencil hardness | (*3) | 140° C. | H | H | H | F | H | H | H | H |
|  |  | 100° C. | F | F | F | HB | F | F | 4B | HB |
| Xylol resistance | (*4) | 140° C. | A | A | A | A | A | A | A | A |
|  |  | 100° C. | B | B | B | B | B | B | E | B |
| Image gloss-1 | (*5) | 140° C. | 91 | 93 | 84 | 90 | 90 | 90 | 82 | 90 |
|  |  | 100° C. | 88 | 90 | 75 | 85 | 84 | 85 | 70 | 90 |
| Image gloss-2 | (*6) | 140° C. | 78 | 82 | 75 | 80 | 78 | 80 | 60 | 80 |
| Adherence | (*7) | 140° C. | 100/100 | 100/100 | 100/100 | 100/100 | 100/100 | 100/100 | 100/100 | 100/100 |
|  |  | 100° C. | 100/100 | 100/100 | 100/100 | 100/100 | 100/100 | 100/100 | 100/100 | 100/100 |
| Adherence after immersion in boiling water (1H) |  | 140° C. | 100/100 | 100/100 | 80/100 | 100/100 | 100/100 | 100/100 | 100/100 | 80/100 |
| Impact resistance |  | 140° C. | 30 | 30 | 30 | 50 | 30 | 30 | 30 | 40 |
|  | (*8) | 100° C. | 30 | 30 | 30 | 50 | 30 | 30 | 10 | 30 |
| Chipping resistance |  | 140° C. | B | B | B | B | B | B | B | B |
|  | (*9) | 100° C. | B | B | B | B | B | B | D | B |
| NV content at application | (*10) | — | 60 | 68 | 58 | 60 | 60 | 60 | 56 | — |
| Pot life (*11) |  |  | A | A | A | A | A | A | A | E |

Film performance test II

A primer coat of Soflex No. 2500 (trademark, Kansai Paint Co., Ltd., a urethane-modified chlorinated polypropylene resin) was applied to a polypropylene resin plate in a dry thickness of 15 to 20 μm and baked at 80° C. for 20 minutes. Then, an intermediate coat was ap- As comparative examples, Rugerbake AM (Paint No. Retan PG80 (Paint No. 8), Magicron No. 1000 Base Coat (silver) (trademark, Kansai Paint Co., Ltd., an acryl-melamine resin system, Paint No. 20) and Magicron No. 1000 Clear (trademark, Kansai Paint Co., Ltd., an acryl-melamine resin system, Paint No. 21) were used.

TABLE 4

| | Paint No. | | | | | | | | | | |
|---|---|---|---|---|---|---|---|---|---|---|---|
| | solid color coat | | | | | 2ClB Base coat (Silver) | | | | | 2ClB Clear coat |
| | 9 | 10 | 11 | 12 | 13 | 14 | 15 | 16 | 17 | 18 | 19 |
| Copolymer - 1 | 70 | | | | | 70 | | | | | |
| Copolymer - 2 | | 70 | 100 | | | | | 70 | | | |
| Copolymer - 3 | | | | | | | 95 | | 100 | | |
| Copolymer - 5 - I | | | | 35 | | | | | | 35 | |
| Copolymer - 5 - II | | | | 35 | | | | | | 35 | |
| Copolymer - 6 - I | | | | | 35 | | | | | | 35 |
| Copolymer - 6 - II | | | | | 35 | | | | | | 35 |
| Oligomer A (*1) | 30 | 30 | 0 | 30 | 30 | | 30 | 30 | 0 | 30 | 30 |
| tris(Acetylacetonato)-aluminum | 1 | 1 | | 1 | | 1 | 1 | 1 | | 1 | |
| tetrakis(Acetylacetonato)-zirconium | | | 1 | | | | | | 1 | | |
| Diisopropoxybis-(acetylacetonato)titanium | | | | | 1 | | | | | | 1 |
| Al pigment (*12) | | | | | | 13 | | | | | |
| Titanium dioxide (*2) | 80 | 80 | 80 | 80 | 80 | — | | | | | |
| Cellulose acetate butyrate | | | | | | 5 | | | | | |

(*12) Al Paste #55-519: Toyo Aluminum Co., Ltd.

Film performance tests III

An epoxy cationic electrodeposition paint (dry thickness; 25 μm) was applied to dull-finished steel sheets (chemically treated) and baked at 170° C. for 30 minutes. Then, an intermediate coating composition of Rugerbake AM (trademark, Kansai Paint Co., Ltd., an automotive polyester resin/melamine resin paint) was applied in a dry thickness of 30 μm and baked at 140° C. for 30 minutes. Then, the coated surface was buffed with No. 400 sandpaper in the presence of water and, after draining and drying, wiped with petroleum benzene for use as a substrate. The top solid color coatings (white) and 2ClB clear coatings were respectively diluted with Swasol No. 1000 (trademark, Maruzen Oil Co., Ltd., a petroleum-based mixed solvent) to a viscosity of 22 seconds (Ford Cup No. 4, 20° C.), while the viscosity of the 2ClB base coating (silver) was adjusted to 13 seconds (Ford Cup No. 4, 20° C.) using a 80:20 mixture of toluene and Swasol No. 1500 (trademark, Maruzen Oil Co., Ltd.). The diluted coatings were applied by air spray. Thus, the top solid color coating (white) was applied in a dry thickness of 40 to 50 μm. In the case of 2ClB metallic coat, the 2ClB base coating was first applied and, after an interval of 3 minutes, the 2ClB clear coating was applied in dry thicknesses of 15 to 20 μm and 35 to 45 μm, respectively. The coated materials were allowed to stand at room temperature for 10 minutes and, then, baked under the two different baking conditions of 100°C.×30 minutes and 140°C.×30 minutes.

The results of film performance tests are shown in Tables 5 and 6.

Test methods (*13) Image gloss

The evaluation was made with an image gloss meter (Suga Testing Machines Co., Ltd.). The figures in the table represent ICM values which may vary from 0 to 100%. The larger the value, the greater is the image gloss and any value not less than 80 represents a high image gloss.

(*14) Acid resistance

Each testpiece was immersed in 40% sulfuric acid ($H_2SO_4$) at 40° C. for 5 hours, at the end of which time it was taken out and rinsed. The condition of the coated surface was evaluated and rated on a 5-grade scale from (A) no fault to (E) fault (marked loss of gloss, blistering, whitening, erosion, etc.)

(*15) Scratch resistance

The dyed product abrasion fastness tester (Daiei Chemical Precision Machinery Co.) was used. A polishing powder (Daruma Cleanser) was kneaded with a small amount of water and the resultant mass was placed on the coated surface. Then, with the kneaded mass of polishing powder retained by the machine terminal unit, a frictional load of 0.5 kg was applied against the coated surface in 25 reciprocating strokes. After rinse, the degree of scratches was evaluated and rated on a 5-grade scale of (A) through (E).

(*16) Pot life

Each coating composition diluted to a predetermined viscosity (22 seconds/Ford Cup No. 4) was covered to prevent exposure to the atmosphere and stored at 40° C. for 1 week.

The results was evaluated and rated on a 5-grade scale of (A) a viscosity increase of less than 5 seconds through (C) a viscosity increase of 5 to 10 seconds to (E) gelation.

(*17) NV content at application

The nonvolatile content (wt%) on heating after dilution to a coating viscosity of 22 seconds/Ford Cup No. 4.

(*18) Water resistance

Each testpiece was immersed in water at 40° C. for 10 days and the condition of the coated surface was evaluated.

(*19) Weatherability

Using the QUV weather-o-meter (manufactured by Q Panel Co., Ltd.), an accelerated exposure test was carried out.

One cycle:
UV irradiation: 8 hr/60° C.
Water condensation: 4 hr/50° C.

After 3000-hour exposure (125 cycles), the coated surface of the testpiece was evaluated.

TABLE 5

| | | Heating conditions | Top solid color coat (white) | | | | | Control |
|---|---|---|---|---|---|---|---|---|
| | | | This invention | | | | | |
| | | | No. 9 | No. 10 | No. 11 | No. 12 | No. 13 | No. 7 |
| Image gloss | (*13) | 140° C. | 92 | 92 | 86 | 92 | 92 | 86 |
| | | 100° C. | 92 | 93 | 88 | 93 | 93 | — |
| Pencil hardness | | 140° C. | 2H | 2H | 2H | 2H | 2H | 2H |
| | (*3) | 100° C. | H | H | H | H | H | 4B |
| Xylol resistance | | 140° C. | A | A | A | A | A | B |
| | (*4) | 100° C. | B | B | B | B | B | E |
| Adherence | (*7) | 140° C. | 100/100 | 100/100 | 100/100 | 100/100 | 100/100 | 100/100 |
| | | 100° C. | 100/100 | 100/100 | 100/100 | 100/100 | 100/100 | 100/100 |
| Acid resistance | | 140° C. | A | A | A | A | A | E |
| | (*14) | 100° C. | A | A | A | A | A | E |
| Scratch resistance | | 140° C. | A | A | A | A | A | B |
| | (*15) | 100° C. | B | B | B | B | B | E |
| Pot life | (*16) | — | A | A | A | A | A | A |
| NV content at application | (*17) | — | 58 | 68 | 57 | 58 | 58 | 55 |
| Water resistance | | 140° C. | A | A | A | A | A | A |
| | (*18) | 100° C. | A | A | A | A | A | A |
| Weatherability | | 140° C. | A | A | A | A | A | C Chalking |
| | (*19) | 100° C. | A | A | A | A | A | E Chalking |

TABLE 6

| | | | Two-coat one-bake silver metallic coat | | | | | Control |
|---|---|---|---|---|---|---|---|---|
| | | | This invention | | | | | |
| | | | Base coat No. | | | | | |
| | | | 14 | 14 | 14 | 14 | 14 | 20 |
| | | | Clear coat No. | | | | | |
| | | | 15 | 16 | 17 | 18 | 19 | 21 |
| Image gloss | | 140° C. | 85 | 87 | 78 | 85 | 86 | 75 |
| | (*13) | 100° C. | 88 | 89 | 80 | 88 | 88 | — |
| Pencil hardness | | 140° C. | H | H | H | H | H | H |
| | (*3) | 100° C. | H | H | H | H | H | 4B |
| Xylol resistance | | 140° C. | A | A | A | A | A | B |
| | (*4) | 100° C. | B | B | B | B | B | E |
| Adherence | (*7) | 140° C. | 100/100 | 100/100 | 100/100 | 100/100 | 100/100 | 100/100 |
| | | 100° C. | 100/100 | 100/100 | 100/100 | 100/100 | 100/100 | 100/100 |
| Acid resistance | | 140° C. | A | A | A | A | A | E |
| | (*14) | 100° C. | A | A | A | A | A | E |
| Scratch resistance | | 140° C. | B | B | B | B | B | D |
| | (*15) | 100° C. | C | C | C | C | C | E |
| Pot life | (*16) | — | A | A | A | A | A | A |
| NV content at application | (*17) | — | 55 | 60 | 50 | 55 | 55 | 40 |
| Water resistance | | 140° C. | A | A | A | A | A | A |
| | (*18) | 100° C. | A | A | A | A | A | D Loss of gloss |
| Weatherability | | 140° C. | A | A | A | A | A | A |
| | (*19) | 100° C. | A | A | A | A | A | E Whitening |

Film performance tests IV

A primer coat of Soflex No. 2500 was applied to a polypropylene resin plate in a dry thickness of 15 to 20 μm and baked at 80° C. for 20 minutes. Thereafter, the top solid color coating was applied in a dry thickness of 40 to 50 μm and baked at 80° C. for 30 minutes. As a comparative example (Paint No. 8), 80 parts by weight of titanium dioxide was added per 100 parts by weight of the nonvolatile matter of the resin. The results of film performance tests are shown in Table 7.

TABLE 7

| | | This invention No. 11 | Control No. 8 |
|---|---|---|---|
| Image clarity | (*13) | 89 | 85 |
| Pencil hardness | (*3) | H | F |
| Xylol resistance | (*4) | B | B |
| Adherence | (*7) | 100/100 | 100/100 |
| Acid resistance | (*14) | A | A |
| Scratch resistance | (*15) | B | D |
| Pot life | (*16) | A | E |
| NV content at application | (*17) | 57 | 52 |
| Water resistance | (*18) | A | A |
| Weatherability | (*19) | A | A |

What is claimed is:

1. An automotive coating composition comprising
   (i) 100 parts by weight of a basal resin which is either
      (a) a copolymer containing a polysiloxane macromonomer having two or more functional groups selected from the class consisting of hydroxyl and alkoxy groups per molecule and a number average molecular weight of 400 to 100,000 prepared by reacting 70 to 99.999 mole percent of a compound (A) of the formula:

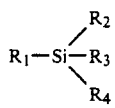

wherein $R_1$ is an aliphatic hydrocarbon group of 1 to 8 carbon atoms or a phenyl group; $R_2$, $R_3$ and $R_4$ independently represent an alkoxy group of 1 to 4 carbon atoms or a hydroxyl group with 30 to 0.001 mole percent of a compound (B) of the formula:

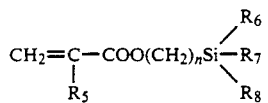

wherein $R_5$ is a hydrogen atom or a methyl group; $R_6$, $R_7$ and $R_8$ independently represent a hydroxyl group, an alkoxy group of 1 to 4 carbon atoms or an aliphatic hydrocarbon group of 1 to 8 carbon atoms; provided, however, that all of $R_6$, $R_7$ and $R_8$ are not aliphatic hydrocarbon groups of 1 to 8 carbon atoms; n is an integer equal to 1to 6, inclusive, and an oxirane group-containing vinyl monomer as comonomer units or (b) a mixture of a polymer (I) containing said polysiloxane macromonomer as an essential monomer unit and a polymer (II) containing an oxirane group-containing vinyl monomer as an essential monomer unit;

(ii) 0.1 to 30 parts by weight of a chelate compound selected from the class consisting of aluminum chelate compounds, titanium chelate compounds and zirconium chelate compounds; and (iii) 5 to 60 parts by weight, based on 100 parts by weight of said basin resin, of a low molecular weight compound with at least two oxirane groups per molecule and having a number average molecular weight of not more than 2,000.

2. The automotive coating composition of claim 1 wherein said compound (A) is at least one compound selected from the class consisting of methyltrimethoxysilane, phenyltrimethoxysilane, butyltrimethoxysilane, methytriethoxysilane, methyltributoxysilane, phenyltrisilanol and methyltrisilanol and said compound (B) is at least one compound selected from the class consisting of γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol, γ-acryloxypropylmethyldimethoxysilane and γ-methacryloxypropylmethyldimethoxysilane.

3. The automotive coating composition of claim 1 wherein said polysiloxane macromonomer has an average of 0.2 to 1.9 polymerizable unsaturated bonds per molecule.

4. The automotive coating composition of claim 1 wherein said oxirane group-containing vinyl monomer is an alicyclic oxirane group-containing vinyl monomer.

5. The automotive coating composition of claim 1 wherein said basal resin is a copolymer containing said polysiloxane macromonomer and an oxirane group-containing vinyl monomer as comonomer units and having a number average molecular weight of 3,000 to 30,000.

6. The automotive coating composition of claim 1 wherein said basal resin is a polymer mixture consisting of, based on the total amount of polymers, 5 to 95 weight percent of said polymer (I) and 95 to 5 weight percent of said polymer (II).

7. The automotive coating composition of claim 1 wherein said chelate compound contains a compound capable of keto-enol tautomerism as a chelate ring-forming ligand.

8. The automotive coating composition of claim 1 which is used as an intermediate coating in an automotive finishing process.

9. The automotive coating composition of claim 1 which is used as a top coating in an automotive finishing process.

* * * * *